US006986037B1

(12) United States Patent
Assmann

(10) Patent No.: US 6,986,037 B1
(45) Date of Patent: Jan. 10, 2006

(54) ELECTRONIC MAIL SYSTEM WITH AUTHENTICATION/ENCRYPTION METHODOLOGY FOR ALLOWING CONNECTIONS TO/FROM A MESSAGE TRANSFER AGENT

(75) Inventor: Claus Assmann, Berkely, CA (US)

(73) Assignee: Sendmail, Inc., Emeryville, CA (US)

( * ) Notice: Subject to any disclaimer, the term of this patent is extended or adjusted under 35 U.S.C. 154(b) by 946 days.

(21) Appl. No.: 09/585,701

(22) Filed: May 31, 2000

Related U.S. Application Data

(60) Provisional application No. 60/195,979, filed on Apr. 7, 2000.

(51) Int. Cl.
*H04L 9/00* (2006.01)
(52) U.S. Cl. .................... 713/155; 713/151; 713/153; 713/160; 713/168; 380/255; 709/200
(58) Field of Classification Search ............... 713/155, 713/200, 201, 151, 153, 160, 168
See application file for complete search history.

(56) References Cited

U.S. PATENT DOCUMENTS

| 5,604,803 | A | | 2/1997 | Aziz |
| 5,764,639 | A | | 6/1998 | Staples et al. |
| 5,784,566 | A | | 7/1998 | Viavant et al. |
| 5,790,793 | A | * | 8/1998 | Higley ........................ 709/218 |
| 5,845,070 | A | | 12/1998 | Ikudome |
| 5,878,397 | A | * | 3/1999 | Stille et al. .................. 455/466 |
| 5,889,943 | A | * | 3/1999 | Ji et al. ........................ 713/201 |
| 5,892,903 | A | | 4/1999 | Klaus |
| 5,928,333 | A | * | 7/1999 | Landfield et al. ............ 709/245 |
| 5,935,249 | A | * | 8/1999 | Stern et al. .................. 713/201 |
| 5,937,161 | A | * | 8/1999 | Mulligan et al. ............ 709/206 |
| 5,968,177 | A | | 10/1999 | Batten-Carew et al. |
| 5,983,273 | A | | 11/1999 | White et al. |
| 6,009,462 | A | * | 12/1999 | Birrell et al. ................ 709/206 |
| 6,044,395 | A | * | 3/2000 | Costales et al. ............. 709/206 |
| 6,094,485 | A | * | 7/2000 | Weinstein et al. ............. 380/30 |
| 6,105,131 | A | * | 8/2000 | Carroll ........................ 713/155 |
| 6,112,227 | A | * | 8/2000 | Heiner ........................ 709/203 |
| 6,185,681 | B1 | * | 2/2001 | Zizzi ........................... 713/165 |
| 6,185,689 | B1 | | 2/2001 | Todd, Sr. et al. |
| 6,189,027 | B1 | | 2/2001 | Haneda et al. |

(Continued)

FOREIGN PATENT DOCUMENTS

GB 2369530 A1 * 5/2002

(Continued)

OTHER PUBLICATIONS

Al-Hammadi et al, Certified Exchange of Electronic Mail (CEEM), 1999, IEEE, pp. 40-43.*

(Continued)

*Primary Examiner*—Ayaz Sheikh
*Assistant Examiner*—Aravind K Moorthy
(74) *Attorney, Agent, or Firm*—John A. Smart

(57) ABSTRACT

An electronic mail ("e-mail") system is described that enforces authentication or encryption to/from Mail Transfer Agents and from Mail User Agents. In one embodiment, for example, an electronic mail (e-mail) system is described that comprises: a message transfer agent (MTA) available for a client to connect to; program logic for authenticating the client, through use of a certificate, in order to identify the client as approved for establishing a secured connection with the MTA; program logic for establishing a secured connection between the client and the MTA in instances where the client can be authenticated; program logic for testing encryption strength of the secured connection; and program logic for terminating the secured connection in instances where the secured connection has inadequate encryption strength.

35 Claims, 12 Drawing Sheets

U.S. PATENT DOCUMENTS

| | | | |
|---|---|---|---|
| 6,192,410 B1 | 2/2001 | Miller et al. | |
| 6,215,875 B1 * | 4/2001 | Nohda | 380/202 |
| 6,233,577 B1 * | 5/2001 | Ramasubramani et al. | 707/9 |
| 6,285,991 B1 | 9/2001 | Powar | |
| 6,301,658 B1 * | 10/2001 | Koehler | 713/155 |
| 6,330,070 B1 | 12/2001 | Toyoda et al. | |
| 6,356,937 B1 * | 3/2002 | Montville et al. | 709/206 |
| 6,367,009 B1 * | 4/2002 | Davis et al. | 713/166 |
| 6,504,929 B1 * | 1/2003 | Tsunoo | 380/28 |
| 6,505,300 B2 * | 1/2003 | Chan et al. | 713/164 |
| 6,574,658 B1 * | 6/2003 | Gabber et al. | 709/206 |
| 6,587,874 B1 * | 7/2003 | Golla et al. | 709/220 |
| 6,594,693 B1 * | 7/2003 | Borwankar | 709/219 |
| 6,609,196 B1 * | 8/2003 | Dickinson et al. | 713/154 |
| 6,611,869 B1 * | 8/2003 | Eschelbeck et al. | 709/228 |
| 6,643,686 B1 * | 11/2003 | Hall | 709/206 |
| 6,643,688 B1 * | 11/2003 | Fuisz | 709/206 |
| 6,675,225 B1 * | 1/2004 | Genty et al. | 709/245 |
| 6,763,458 B1 * | 7/2004 | Watanabe et al. | 713/100 |
| 6,795,923 B1 * | 9/2004 | Stern et al. | 713/201 |
| 6,807,277 B1 * | 10/2004 | Doonan et al. | 380/281 |
| 6,865,671 B1 * | 3/2005 | Assmann | 713/154 |

FOREIGN PATENT DOCUMENTS

| | | |
|---|---|---|
| WO | WO0027089 A1 * | 5/2000 |
| WO | WO0067447 A1 * | 11/2000 |

OTHER PUBLICATIONS

Anonymous, POPFile: an 'organic' spam filter, Jan. 2003, The Hindu, p. 1.*

Henry et al, Off-the-record Email System, 2001, IEEE, pp. 869-877.*

Bai et al, Access Revocation and Prevention of False Repudiation in Secure Email Exchanges, 2001, IEEE, pp. 419-425.*

Blundo et al, Certified Email: Design and Implementation of a New Optimistic Protocol, 2003, IEEE, pp. 828-833.*

Garfinkel, Simson, Email-Based Identification and Authentication: An Alternative to PKI?, 2003, IEEE, pp. 20-26.*

Dierks, T. et al., RFC2246: The TLS Protocol—Version 1.0, Internet Engineering Task Force, Jan. 1999.

Hoffman, P., RFC2487: SMTP Service Extension for Secure SMTP over TLS, Internet Engineering Task Force, Jan. 1999.

SENDMAIL, Sendmail for NT: User Guide, Sendmail (Part No.: DOC-SMN-300-WNT-MAN-0999), 1999.

Crispin, M., RFC2061: IMAP4 Compatibility With IMAP2BIS, Internet Engineering Task Force, Doc. 1996.

Crispin, M., RFC2060: Internet Message Access Protocol—Version 4 (rev 1), Internet Engineering Task Force, Nov. 1996.

Myers, J., RFC2033: Local Mail Transfer Protocol, Internet Engineering Task Force, Oct. 1996.

Myers, J., RFC1725: Post Office Protocol—Version 3, Internet Engineering Task Force, Nov. 1994.

Braden, R. (EDITOR), RFC1123: Requirements for Internet Hosts—Application and Support, Internet Engineering Task Force, Oct. 1989.

Rose, M., RFC1081: Post Office Protocol—Version 3, Internet Engineering Task Force, Nov. 1988.

Partridge, Craig, RFC974: Mail Routing and the Domain System, Internet Engineering Task Force, Jan. 1986.

Butler, M. et al., RFC937: Post Office Protocol—Version 2, Internet Engineering Task Force, Feb. 1985.

Crocker, David H., RFC822: Standard For The Format of Arpa Internet Text Messages, Dept. of Electrical Engineering, University of Delaware, Aug. 1982.

Postel, Jonathan B., RFC821: Simple Mail Transfer Protocol, Information Sciences Institute, University of Southern California, Aug. 1982.

* cited by examiner

ELECTRONIC MAIL SYSTEM WITH AUTHENTICATION/ENCRYPTION METHODOLOGY FOR ALLOWING CONNECTIONS TO/FROM A MESSAGE TRANSFER AGENT

RELATED APPLICATIONS

The present application is related to, and claims the benefit of priority from, commonly-owned U.S. provisional application Ser. No. 60/195,979, filed Apr. 7, 2000, titled AUTHENTICATION METHODOLOGY FOR SUPPORTING REMOTE CONNECTIONS TO A MESSAGE TRANSFER AGENT. Additionally, the present application is related to commonly-owned U.S. application Ser. No. 09/562,523, filed May 1, 2000, titled ELECTRONIC MAIL SYSTEM WITH AUTHENTICATION METHODOLOGY FOR SUPPORTING RELAYING IN A MESSAGE TRANSFER AGENT. The disclosures of the foregoing applications (including any attachments and appendices thereof) are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to electronic mail (e-mail) systems and, more particularly, to improved methodology to enforce authentication or encryption to/from Mail Transfer Agents and from Mail User Agents.

Today, electronic mail or "e-mail" is a pervasive, if not the most predominant, form of electronic communication. FIG. 1 illustrates the basic architecture of a typical electronic mail system 10. At a high level, the system includes a mail server connected over a network to various e-mail "clients," that is, the individual users of the system. More specifically, the system 10 includes one or more clients 11 connected over a network to at least one SMTP (Simple Mail Transport Protocol) server or "Message Transfer Agent" (MTA) 12a for routing e-mail. Users write, send, and read e-mail via Mail User Agents (MUA), such as Microsoft Outlook™ or mutt, present at each client (computer). To send e-mail, an MUA connects to an MTA which receives the e-mail and routes it to another MTA. An intermediary MTA might forward the e-mail to yet another MTA until the e-mail reaches the destination system, where the e-mail is stored in a mailbox accessible by the recipient.

A typical e-mail delivery process is as follows. In the following scenario, Larry sends e-mail to Martha at her e-mail address: martha@example.org. Martha's Internet Service Provider (ISP) uses an MTA, such as provided by Sendmail® for NT, available from Sendmail, Inc. of Emeryville, Calif. (With a lower case "s," "sendmail" refers to Sendmail's MTA, which is one component of the Sendmail® Switch product line.)

1. Larry composes the message and chooses Send in Microsoft Outlook Express (a "Mail User Agent" or MUA). The e-mail message itself specifies one or more intended recipients (i.e., destination e-mail addresses), a subject heading, and a message body; optionally, the message may specify accompanying attachments.
2. Microsoft Outlook Express queries a DNS server for the IP address of the local mail server running sendmail. The DNS server translates the domain name into an IP address, 10.1.1.1, of the local mail server.
3. Microsoft Outlook Express opens an SMTP connection to the local mail server running sendmail. The message is transmitted to the sendmail server using the SMTP protocol.
4. sendmail queries a DNS server for the MX record of the destination domain, i.e., example.org. The DNS server returns a hostname, e.g., mail.example.org.sendmail queries a DNS server for the A record of mail.example.org, i.e., the IP address. The DNS server returns an IP address of 127.118.10.3.
5. sendmail opens an SMTP connection to the remote mail server providing e-mail service for example.org which is also running sendmail. The message is transmitted to the sendmail server using the SMTP protocol.
6. sendmail delivers Larry's message for Martha to the local delivery agent. It appends the message to Martha's mailbox. By default, the message is stored in: /var/spool/mail/martha.
7. Martha has her computer dial into her ISP.
8. Martha chooses Check Mail in Eudora.
9. Eudora opens a POP3 (Post Office Protocol version 3, defined in RFC1725) connection with the POP3 (incoming mail) server. Eudora downloads Martha's new messages, including the message from Larry.
10. Martha reads Larry's message.

The MTA, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as Request For Comment documents (RFCs). Typically, the mail server or MTA must temporarily store incoming and outgoing messages in a queue, the "mail queue." Actual queue size is highly dependent on one's system resources and daily volumes.

MTAs, such as the commercially-available Sendmail® MTA, perform three key mail transport functions:
Routes mail across the Internet to a gateway of a different network or "domain" (since many domains can and do exist in a single network)
Relays mail to another MTA (e.g., 12b) on a different subnet within the same network
Transfers mail from one host or server to another on the same network subnet To perform these functions, it accepts messages from other MTAs or MUAs, parses addresses to identify recipients and domains, resolves aliases, fixes addressing problems, copies mail into a queue on its hard disk, tries to process long and hard-to-pass messages, and notifies the sender when a particular task cannot be successfully completed. The MTA does not store messages (apart from its queue) or help users access messages. It relies on other mail system components, such as message delivery agents, message stores and mail user agents (MUAs), to perform these tasks. These additional components can belong to any number of commercial or free products (e.g., POP3 or IMAP servers, Microsoft Exchange, IBM Lotus Notes, Netscape, cc:Mail servers, or the like). Because of its central role in the e-mail systems, however, the MTA often serves as the "glue" that makes everything appear to work together seamlessly.

The overall process may be summarized as follows. E-mail is routed via SMTP servers, the so-called "Mail Transfer Agents" (MTA). Users write, send, and read e-mail via Mail User Agents (MUA). To send e-mail, an MUA connects to an MTA which receives the e-mail and routes it to another MTA. An intermediary MTA might forward the e-mail to yet another MTA until the e-mail reaches the destination system, where the e-mail is stored in a mailbox accessible by the recipient.

For further description of e-mail systems, see e.g., *Sendmail® for NT User Guide*, Part Number DOC-SMN-300-WNT-MAN-0999, available from Sendmail, Inc. of Emeryville, Calif., the disclosure of which is hereby incorporated by reference. Further description of the basic architecture and operation of e-mail systems (including TLS, as described in further detail below) is available in the technical and trade literature; see e.g., the following RFC (Request For Comments) documents:

| | |
|---|---|
| RFC821 | Simple Mail Transfer Protocol (SMTP) |
| RFC822 | Standard for the Format of ARPA Internet Text Messages |
| RFC974 | Mail Routing and the Domain System |
| RFC1123 | Requirements for Internet Hosts -- Application and Support |
| RFC1725 | Post Office Protocol version 3 (POP3) |
| RFC2033 | Local Mail Transfer Protocol (LMTP) |
| RFC2060 | Internet Message Access Protocol (IMAP), Ver. 4, rev. 1 |
| RFC2246 | The TLS Protocol, version 1.0 |
| RFC2487 | SMTP Service Extension for Secure SMTP over TLS | currently available via the Internet (e.g., ftp://ftp.isi.edu/in-notes), the disclosures of which are hereby incorporated by reference. RFCs are numbered Internet informational documents and standards widely followed by commercial software and freeware in the Internet and UNIX communities. The RFCs are unusual in that they are floated by technical experts acting on their own initiative and reviewed by the Internet at large, rather than formally promulgated through an institution such as ANSI. For this reason, they remain known as RFCs even once they are adopted as standards.

In an e-mail system, the system must identify its users to ensure safe usage of the system. In a typical configuration, an MTA exists on a company's local area network and, from the location, sends mail to and receives mail from users, including of course users that are outside of the local area network. Some of those users, particularly "remote" employees, may be communicating with the MTA via the Internet.

Currently, basic SMTP (e.g., as described by RFC821) does not provide any privacy or authentication. The content of e-mail can be read ("sniffed") by many people, including system administrators ("sys admins") with root privileges, and hackers "sniffing" a connection. Further, current attempts to address this problem are incomplete. For instance, some authentication/encryption mechanisms are available which address the problem using end-user to end-user encryption, e.g., PGP and S/MIME. These require that the users have (compatible) encryption mechanisms and software and know how to install, use, and maintain it. Other implementations are available which secure MTA-to-MTA connections. These implementations are not standardized and hence require the same software for each MTA that wants encryption.

TLS (Transport Layer Security), which is based on X509 certificates (public key cryptography), is a generic layer to provide authentication and encryption for many applications. In basic operation, the client and the server can authenticate each other through use of a certificate, a signed public key. STARTTLS is standardized protocol defined in RFC2487, which is based on TLS as described in RFC2246. It allows for authentication of servers and clients in an SMTP session based on public key cryptography (currently X.509 certificates and several ciphers). For an introduction to X.509 certificates, see e.g., Tremblett, P., "X.509 Certificates," Dr. Dobb's Journal, July 1999, pp. 42–51, the disclosure of which is hereby incorporated by reference. RFC2487 does not specify how to ensure that actual transmissions are really authenticated and encrypted. It leaves this up to the actual implementation to enforce a policy.

What is needed is an easy way to ensure that e-mail is sent/received securely to/from a remote system, including authenticating the remote system before transferring e-mails. The present invention fulfills this and other needs.

SUMMARY OF THE INVENTION

An electronic mail ("e-mail") system is described that provides methodology to enforce authentication or encryption to/from Mail Transfer Agents and from Mail User Agents. In accordance with the present invention, support is added to enforce certain restrictions on the connections between two hosts (a server and a client), depending on whether sendmail (Message Transfer Agent) acts as a server (receiving e-mail) or as a client (sending e-mail). In this manner, it is possible for each type of connection to enforce an authentication of the other side or at least a certain key length of the symmetric cipher used for encryption.

A method of the present invention for sending an e-mail message using a secured connection that employs encryption includes the following method steps. A client's request (e.g., Mail User Agent's request) is received at a Message Transfer Agent (MTA) for establishing a secured connection with the MTA for sending an e-mail message. The method attempts to authenticate the client, through use of a certificate. If the client cannot be authenticated, the method terminates without establishing the secured connection and without sending the e-mail message. On the other hand, if the client can be authenticated, the method establishes the secured connection between the client and the MTA. Additionally, the method (optionally) determines whether the encryption employed for the secured connection meets a predefined minimum encryption strength. If the encryption employed does not meet the predefined minimum encryption strength, the method terminates (including terminating the secured connection without sending the e-mail message). However, if the encryption employed does meet the predefined minimum encryption strength, the MTA will send the e-mail message (for ultimate delivery at a target destination).

The above method can be modified so that the MTA acts as the client. In that case, the method is repeated with the MTA attempting to establish a secured connection with another server (e.g., second MTA). If the server can be authenticated, the e-mail message is transmitted on the secured connection. Otherwise, the secured connection is terminated. The first MTA (client, here) can (optionally) terminate the connection if the encryption strength is inadequate.

DETAILED DESCRIPTION OF A PREFERRED EMBODIMENT

The following description will focus on the presently-preferred embodiment of the present invention, which is implemented in a server-side application operating in an Internet-connected environment running under a network operating system, such as FreeBSD running on an IBM-compatible PC. The present invention, however, is not limited to any particular one application or any particular environment. Instead, those skilled in the art will find that the system and methods of the present invention may be advantageously embodied on a variety of different platforms, including Linux, BeOS, Solaris, UNIX, NextStep, and the like. Therefore, the description of the exemplary embodiments which follows is for purposes of illustration and not limitation.

Computer-Based Implementation

A. Basic System Hardware (e.g., for Client and Server Computers)

Figure 1:
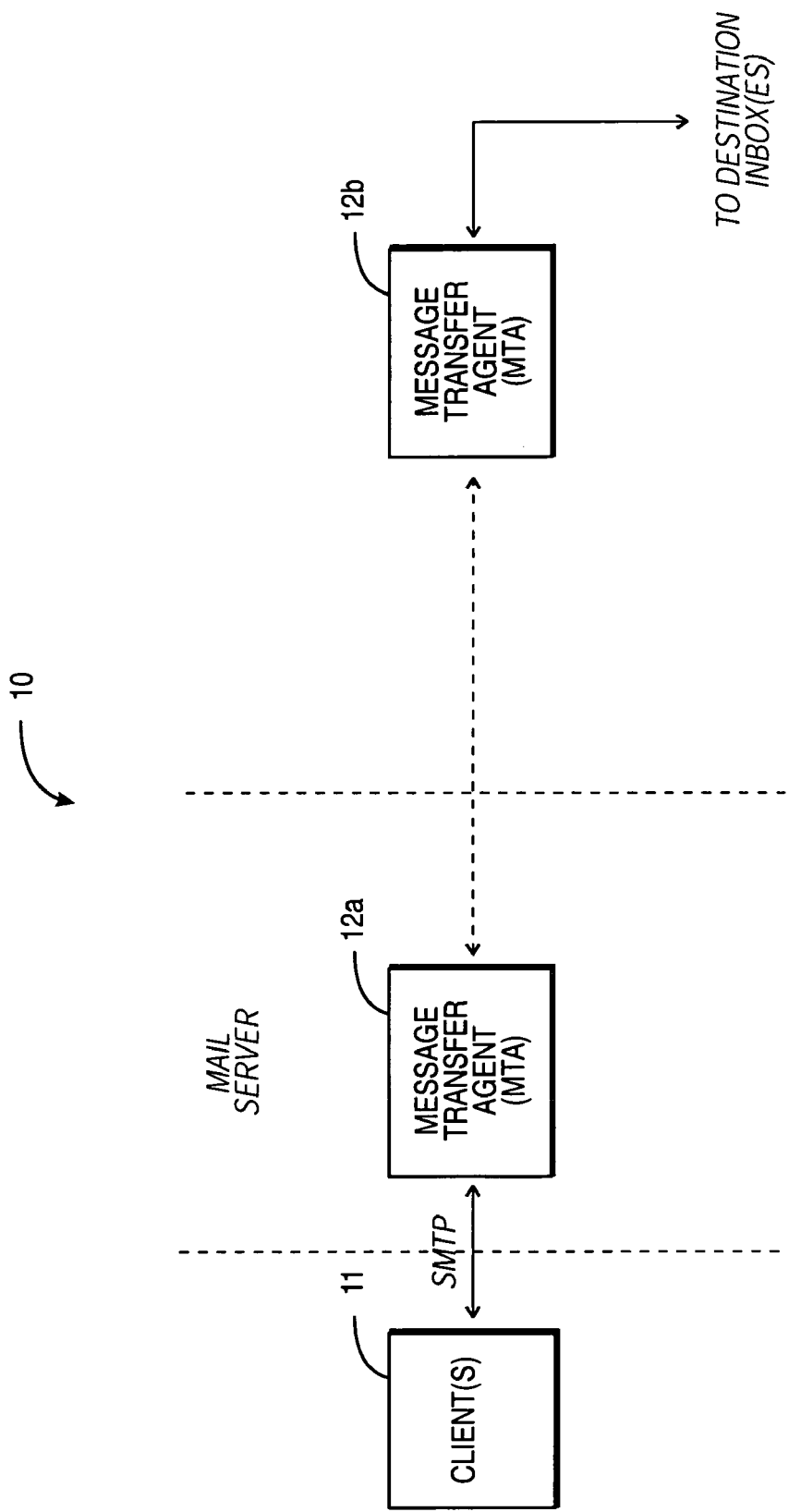
FIG. 1 is a block diagram illustrating the basic architecture of a typical electronic mail system.
Figure 2:
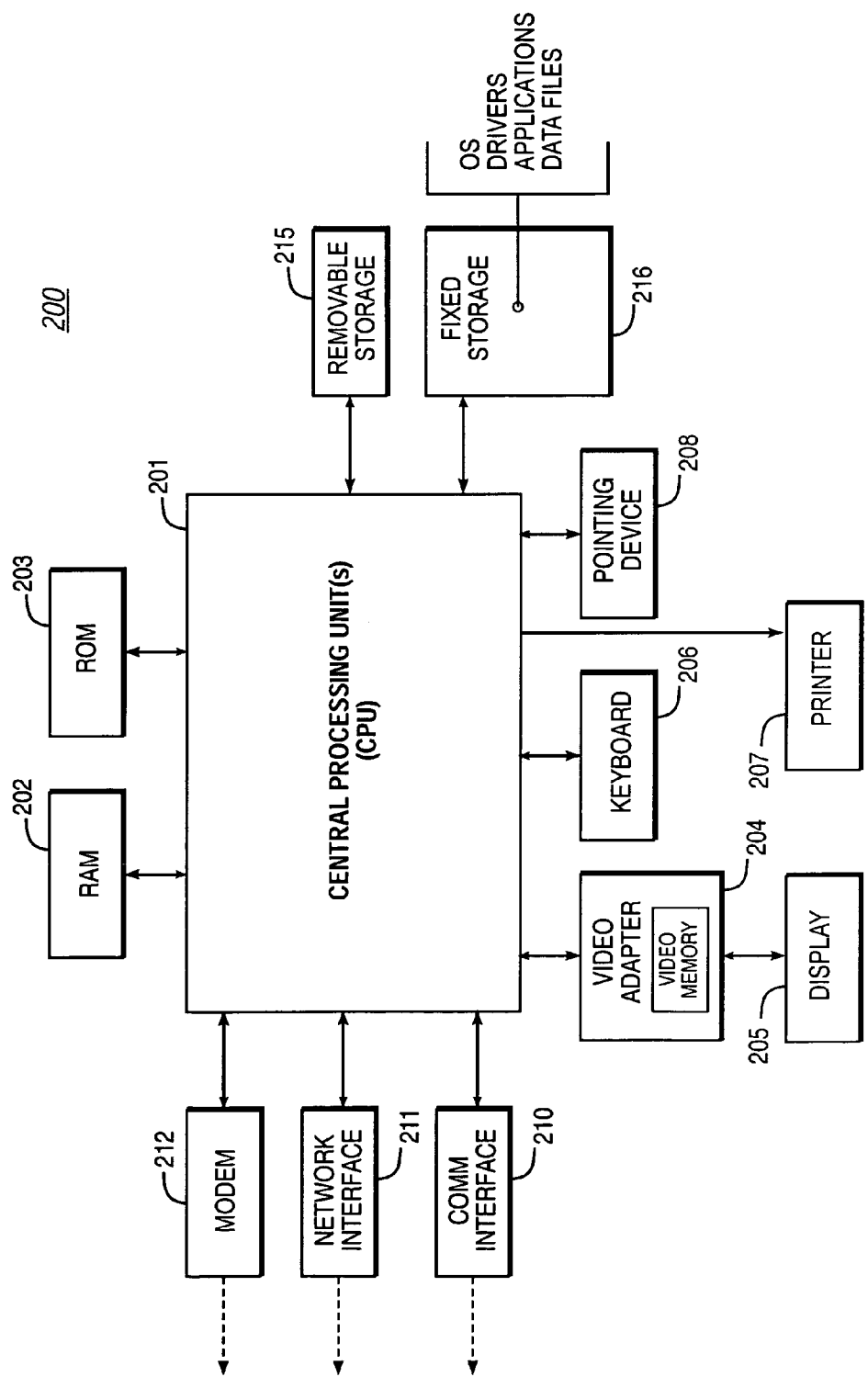
FIG. 2 is a block diagram illustrating a basic computer system suitable for implementing desktop (e.g., e-mail client) and server (e.g., mail server) components of the electronic mail system of the present invention.

The present invention may be implemented on a conventional or general-purpose computer system, such as an IBM-compatible personal computer (PC) or server computer. FIG. 2 is a very general block diagram of an IBM-compatible system 200. As shown, system 200 comprises a central processor unit(s) (CPU) 201 coupled to a random-access memory (RAM) 202, a read-only memory (ROM) 203, a keyboard 206, a pointing device 208, a display or video adapter 204 connected to a display device 205, a removable (mass) storage device 215 (e.g., floppy disk), a fixed (mass) storage device 216 (e.g., hard disk), a communication port(s) or interface(s) 210, a modem 212, and a network interface card (NIC) or controller 211 (e.g., Ethernet). Although not shown separately, a real-time system clock is included with the system 200, in a conventional manner.

CPU 201 comprises a processor of the Intel Pentium® family of microprocessors. However, any other suitable microprocessor or microcomputer may be utilized for implementing the present invention. The CPU 201 communicates with other components of the system via a bi-directional system bus (including any necessary input/output controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif.

Random-access memory 202 serves as the working memory for the CPU 201. In a typical configuration, RAM of sixteen megabytes or more is employed. More or less memory may be used without departing from the scope of the present invention. The read-only memory (ROM) 203 contains the basic input/output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, or flash memory, or any other available mass storage technology. The mass storage may be shared on a network or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the storage device or mass storage 216 into the main (RAM) memory 202, for execution by the CPU 201. During operation of the program logic, the system 200 accepts user input from a keyboard 206 and a pointing device 208, as well as speech-based input from a voice recognition system (not shown). The keyboard 206 permits selection of application programs, entry of keyboard-based input or data, and selection and manipulation of individual data objects displayed on the display device 205. Likewise, the pointing device 208, such as a mouse, track ball, pen device, or the like, permits selection and manipulation of objects on the display device 205. In this manner, these input devices support manual user input for any process running on the system.

The computer system displays text and/or graphic images and other data on the display device 205. Display device 205 is driven by the video adapter 204, which is interposed between the display device 205 and the system 200. The video adapter 204, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 211 connected to a network (e.g., Ethernet network), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication ("comm") interface 210, which may include an RS-232 serial port, a Universal Serial Bus (USB) interface, or the like. Devices that will be commonly connected locally to the comm interface 210 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Sun Solaris workstations, which are available from Sun Microsystems of Mountain View, Calif.

The above-described system 200 of FIG. 2 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having services and/or information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic System Software

Figure 3:
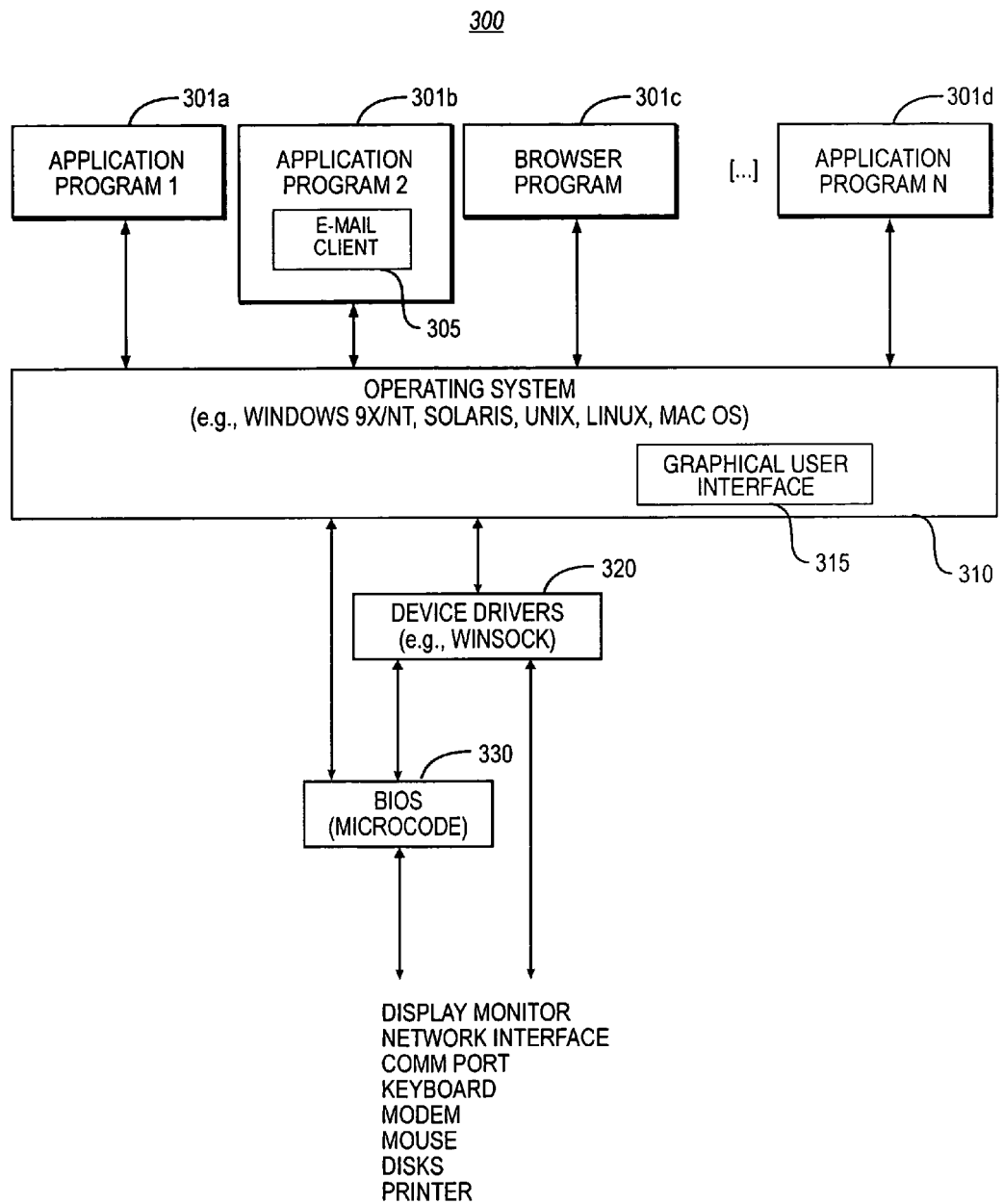
FIG. 3 is a block diagram of a basic software/firmware system suitable for controlling operation of the computer system of FIG. 2.
Figure 4A:
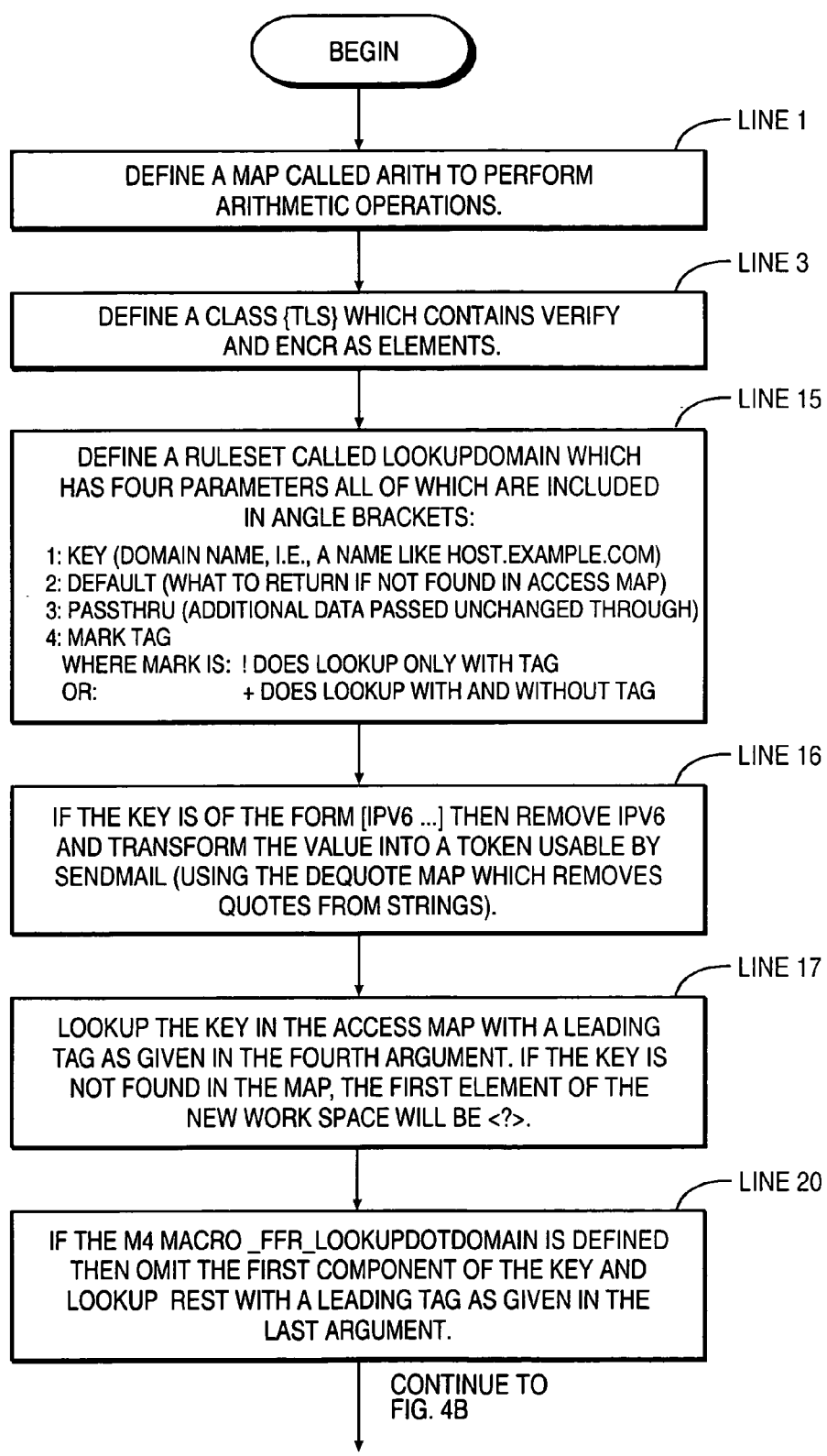
FIGS. 4A–I comprise a flowchart illustrating a methodology of the present invention to enforce authentication or encryption to/from Mail Transfer Agents and from Mail User Agents.
Figure 4B:
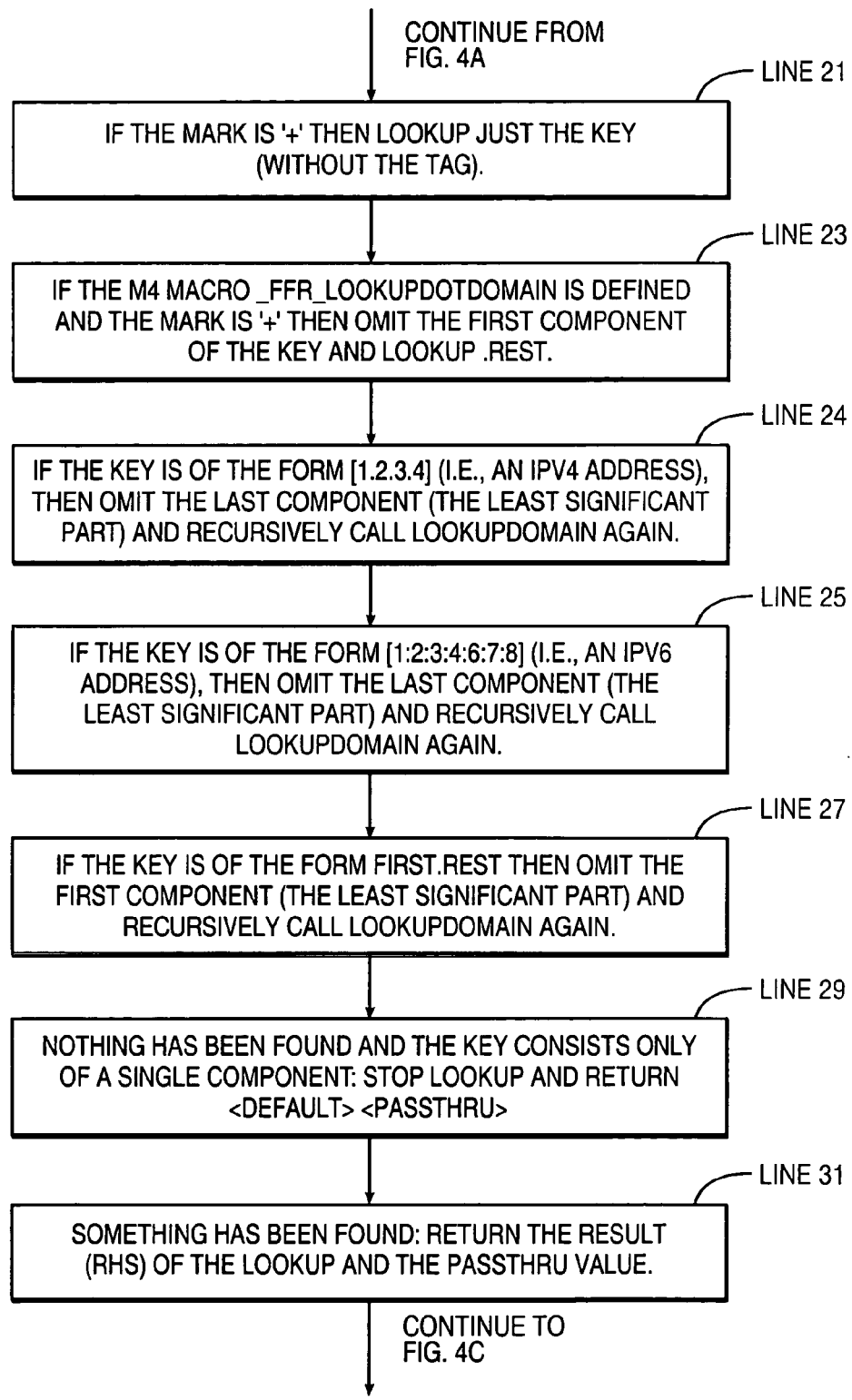
Figure 4C:
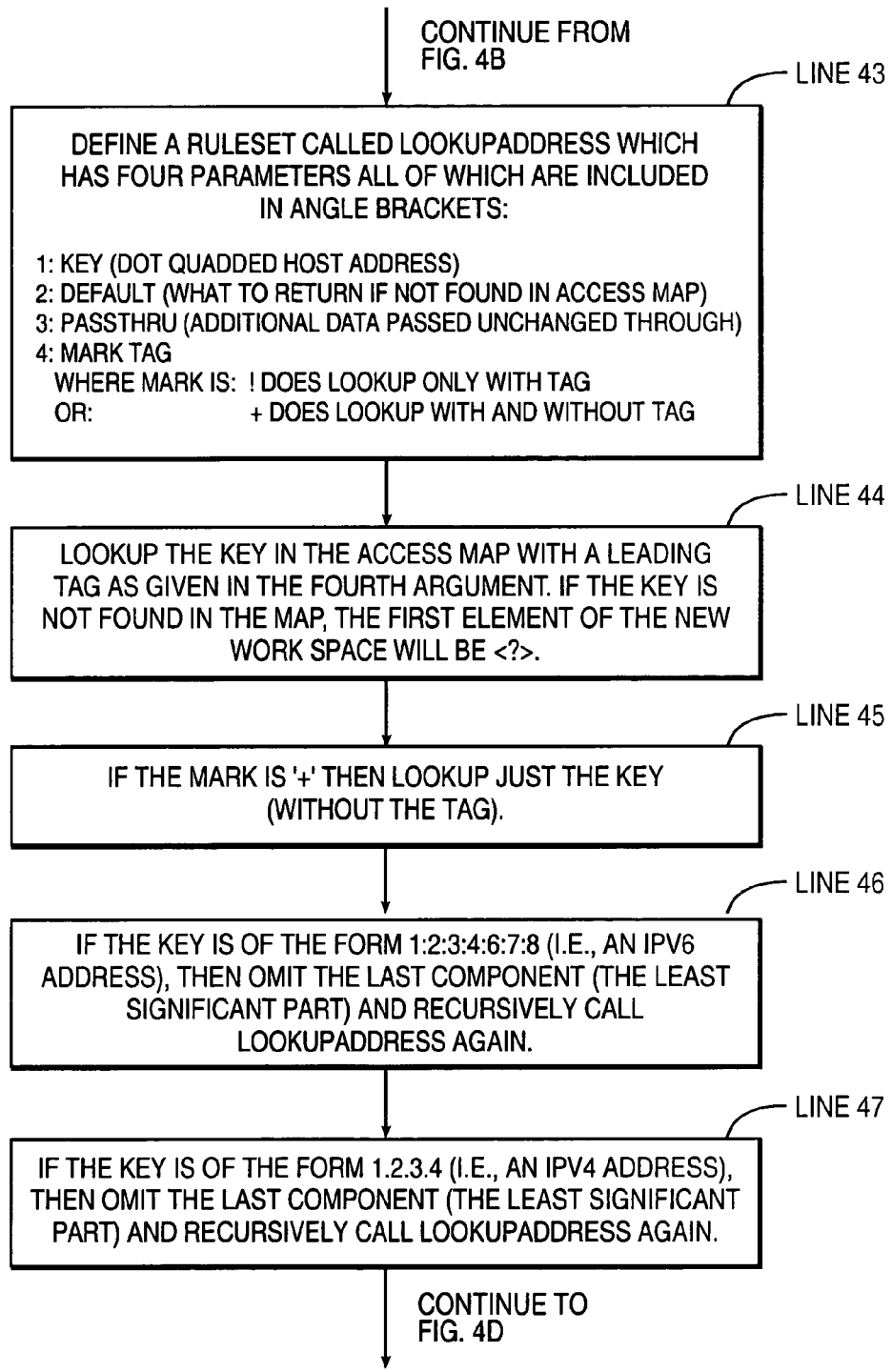
Figure 4D:
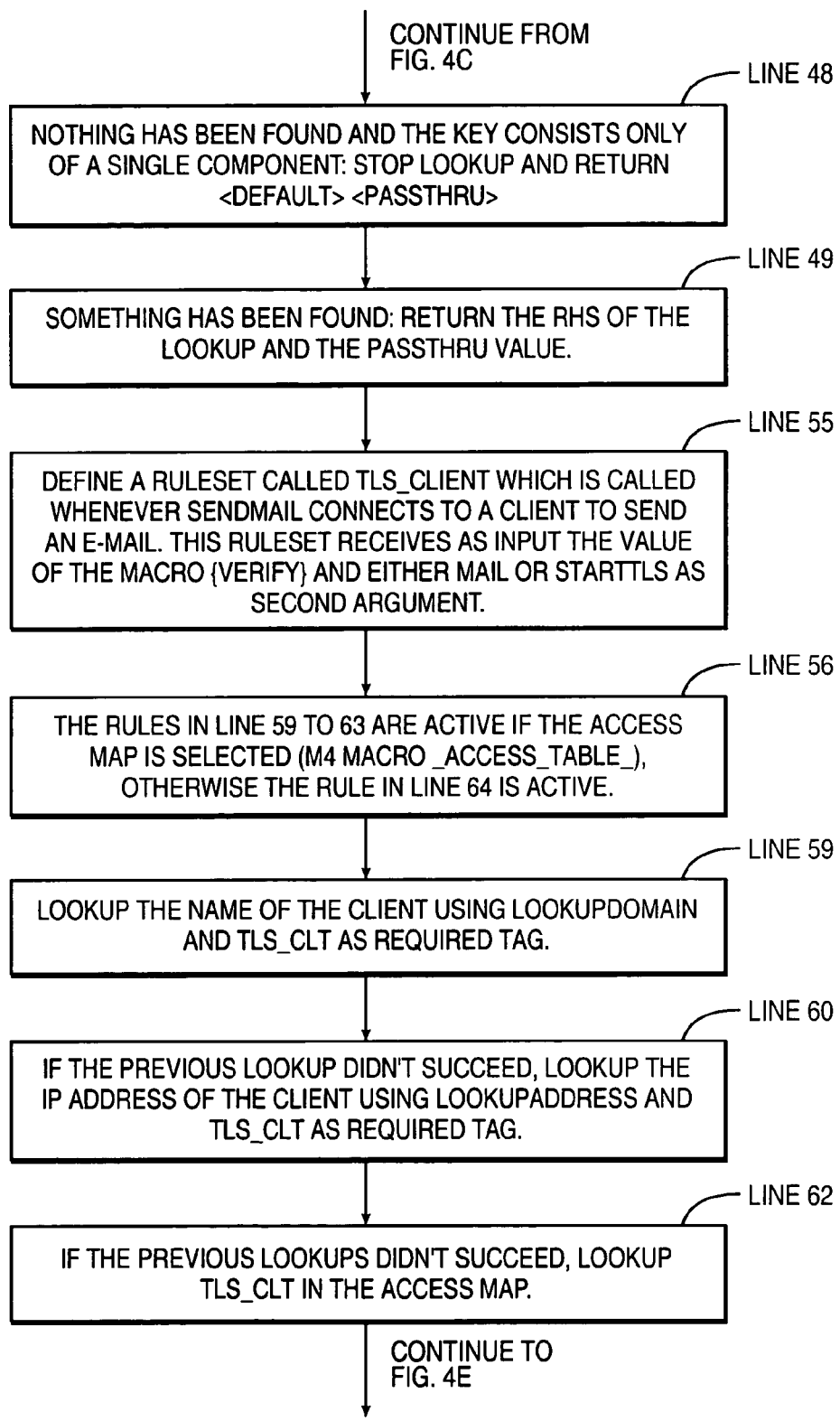
Figure 4E:
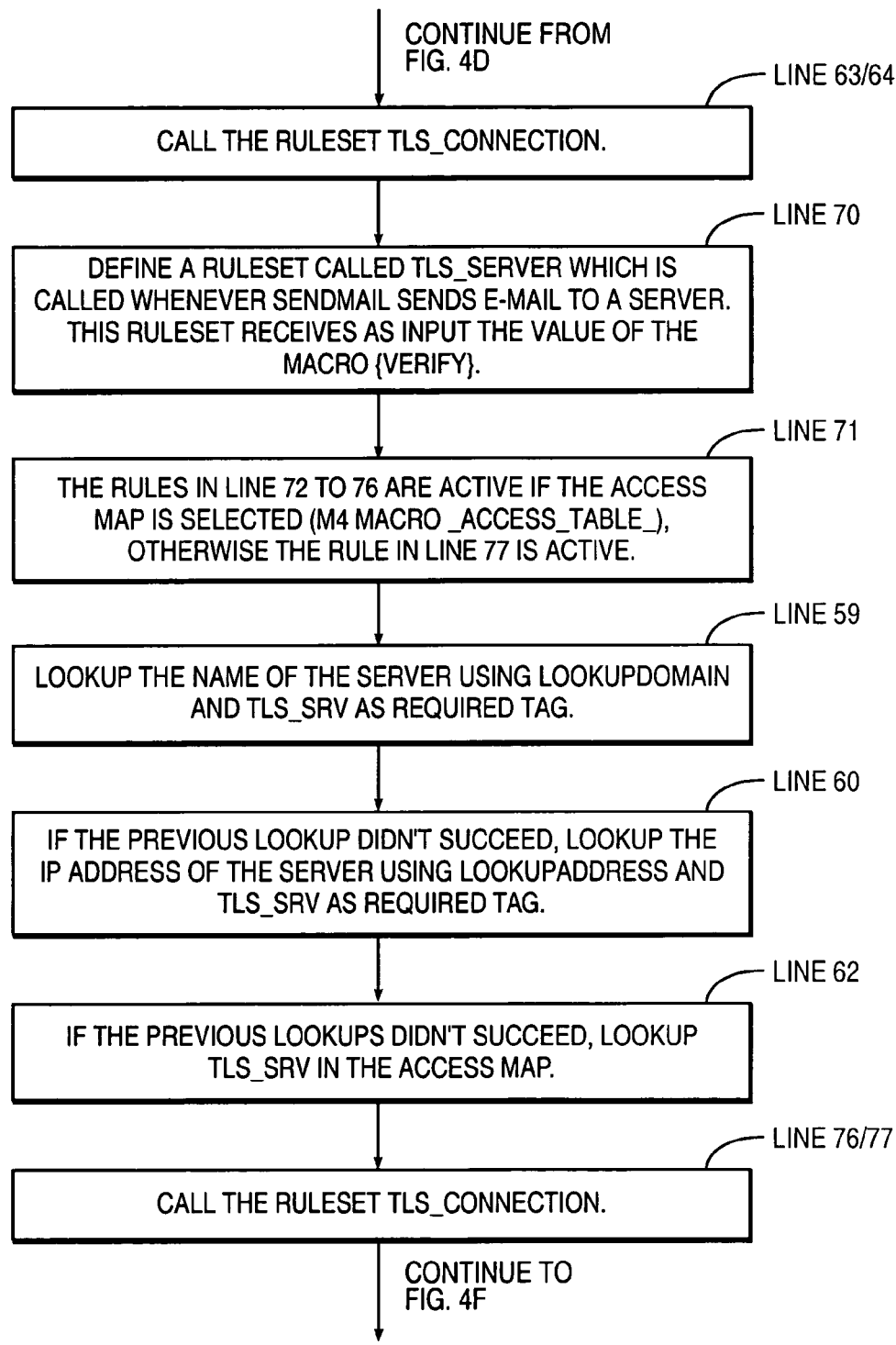
Figure 4F:
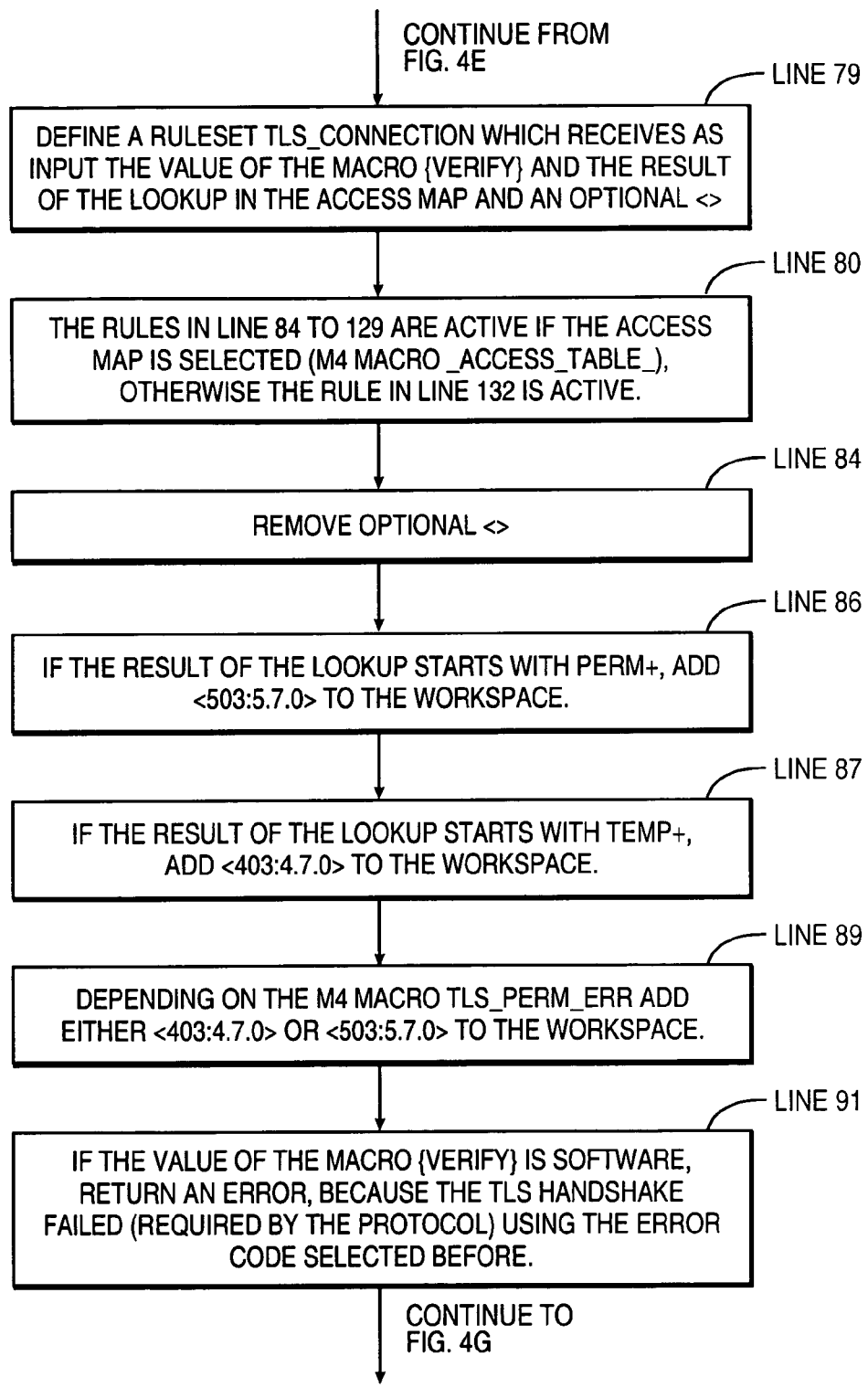
Figure 4G:
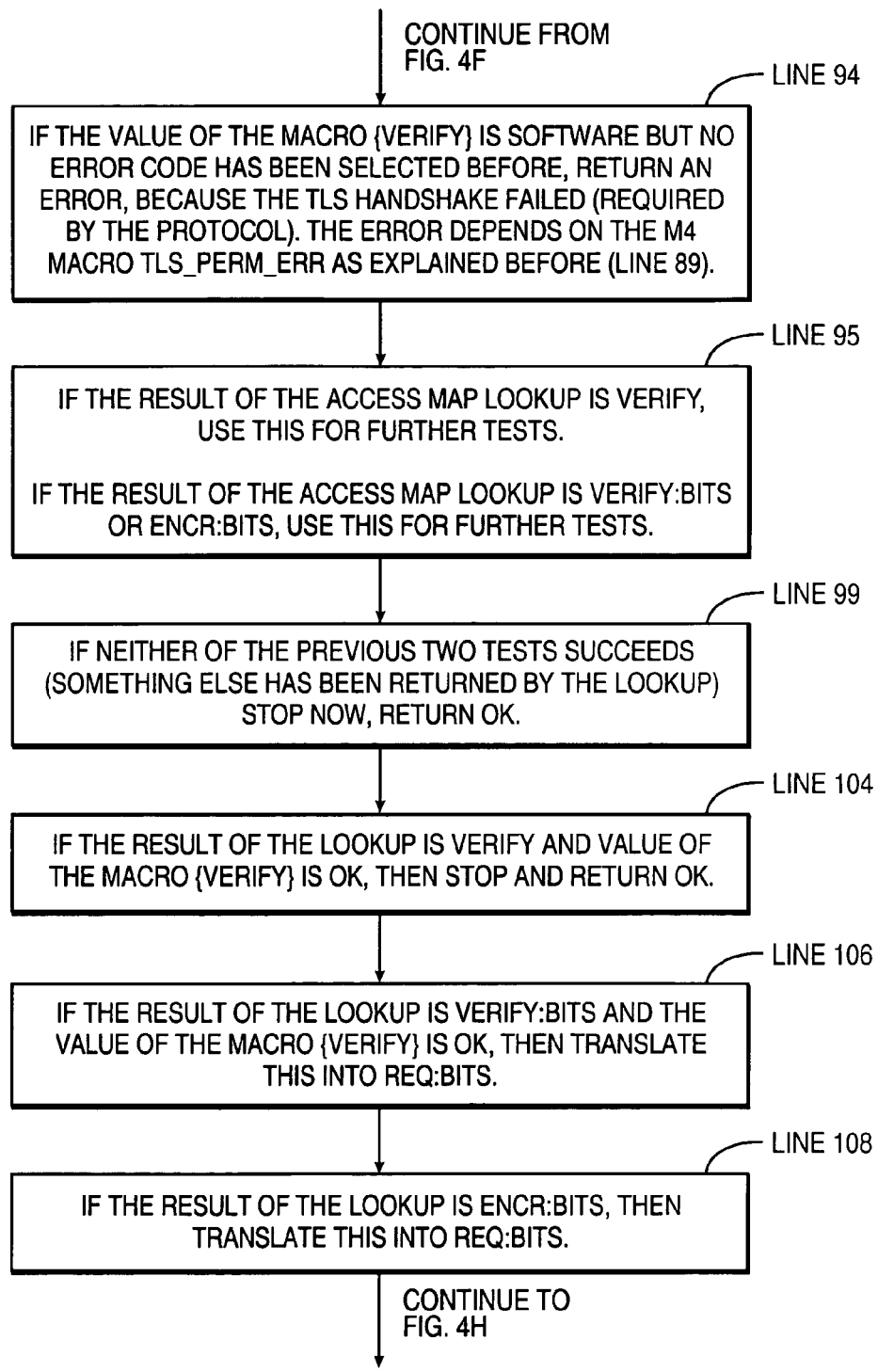
Figure 4H:
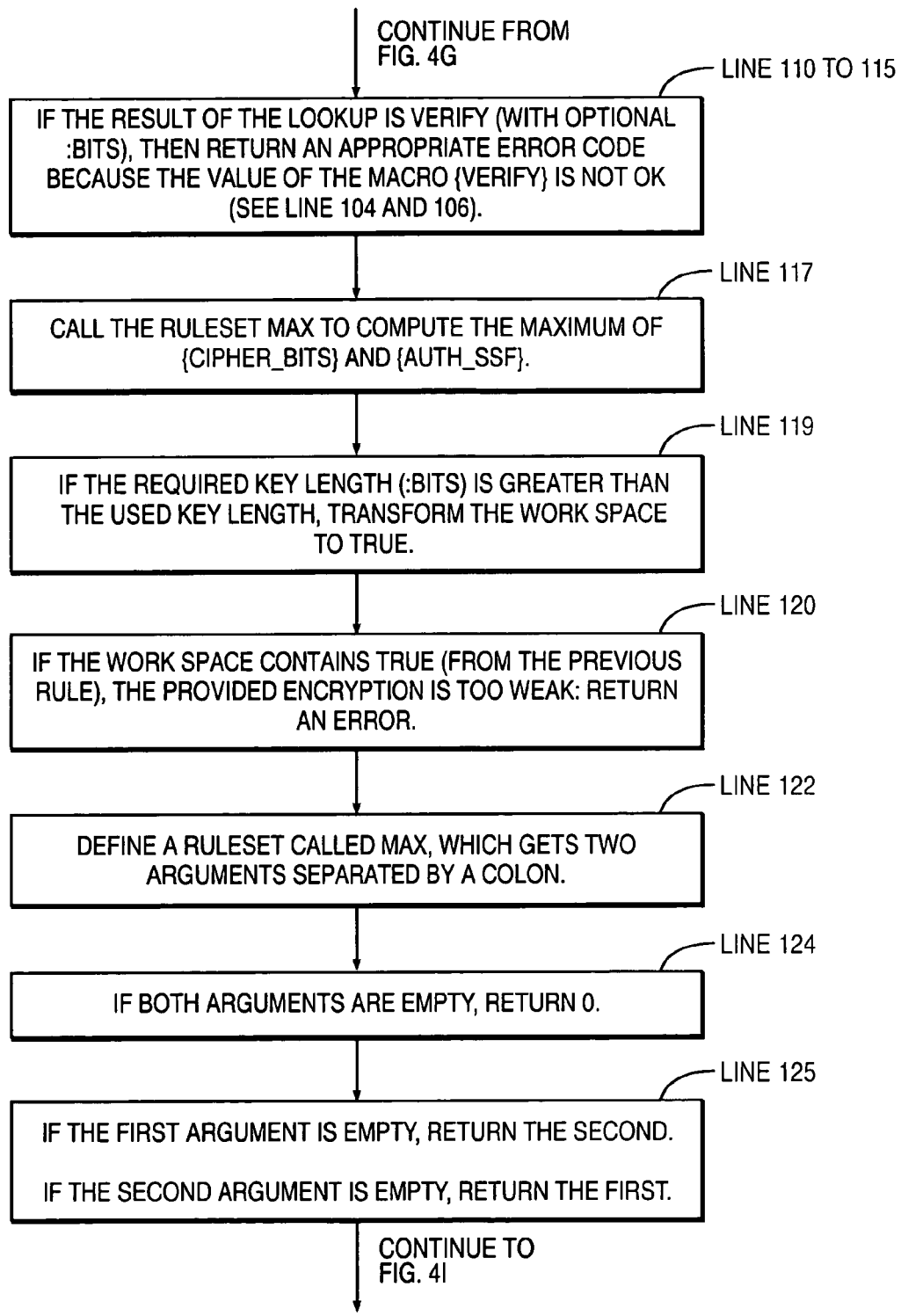
Figure 4I:
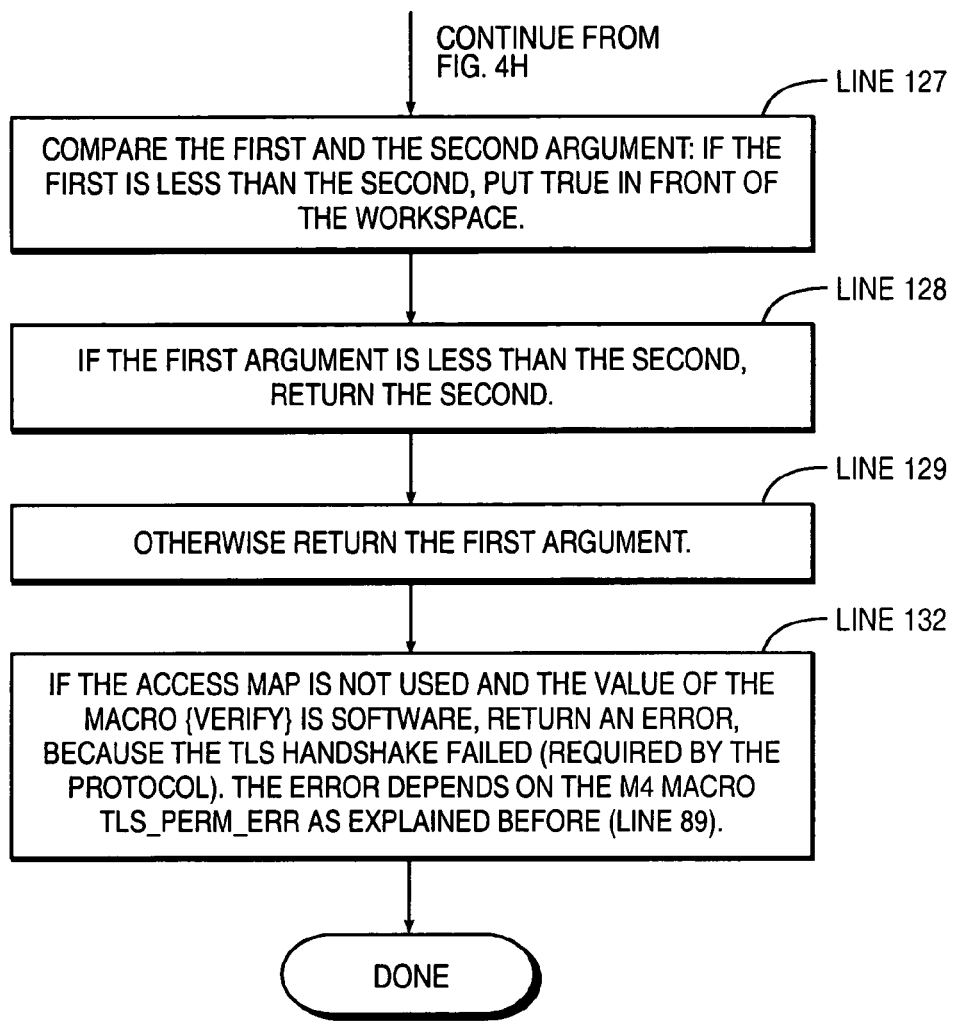

Illustrated in FIG. 3, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" into memory 202) for execution by the software system 300. For instance, when the system 200 is employed to control a desktop machine, application software 301 includes client e-mail software 305 (e.g., Microsoft Outlook, available from Microsoft Corporation of Redmond, Wash.), as shown. When the system 200 is employed to control a server machine, on the other hand, application software 301 includes mail server software (e.g., Sendmail® for NT), including a Message Transfer Agent (MTA) of the present invention.

Software system 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver) and the system BIOS microcode 310 can be provided by a conventional operating system, such as by FreeBSD or by Microsoft® Windows 9x, Microsoft® Windows NT, or Microsoft® Windows 2000, available from Microsoft Corporation of Redmond, Wash. Alternatively, OS 310 can also be an alternative operating system, such as IBM OS/2 (available from IBM of Armonk, N.Y.) or Linux OS (available from several vendors, including the Red Hat distribution of Linux from Red Hat, Inc. of Durham, N.C.).

Methodology to Enforce Authentication or Encryption to/from an MTA or from a MUA A. Including TLS Support within the Sendmail MTA STARTTLS has been implemented in the sendmail MTA for Sendmail Secure Switch 2.0. It is based on existing solutions, including OpenSSL (see e.g., OpenSSL: The open source toolkit for ssl/tls, currently available online at http://www.openssl.org/) and example programs and a patch for Postfix (see e.g., Lutz Jaenicke, Postix, 2000, currently available at http://www.aet.tu-cottbus.de/personen/jaenicke/pfixtls/). X.509 certificates tie a Distinguished Name (DN) together with a public key and those data structures are digitally signed by a Certificate Authority (CA). According to the X.509 standard, a Distinguished Name consists of several named fields, such as Country (C), State (ST), Location (L), Organization (O), and a Common Name (CN). The DN of the CA is called the cert issuer, and the DN of the cert itself is called the cert subject. The sendmail binary (i.e., "sendmail") uses a configuration file (sendmail.cf) to define several options, routing of e-mail, rewriting of addresses, and rejection or acceptance of connections and relaying attempts. The interaction of sendmail with its configuration file is defined by options, macros, classes, rulesets, and mailer definitions. For example, the decision whether an e-mail is relayed is based on a ruleset called check rcpt.

To communicate parameters of the SMTP dialogue to the configuration file, the sendmail binary sets macros whose values can be used in rulesets. Thus during run-time operation, one can determine whether something is available or set (e.g., state information) by accessing the corresponding macro value. The result of the TLS handshake protocol is reflected in several macros, the most important for the present invention is whether the client could be authenticated. In addition, cert issuer and cert subject are stored in variables beside other data. Based on whether a particular client is authenticated, the system may decide whether to allow or reject message relaying.

B. Internal Operation

1. General

TLS only allows one to control the connection between two hosts: a server and a client. In accordance with the present invention, therefore, support is added to enforce certain restrictions on these connections, depending on whether sendmail acts as a server (receiving e-mail) or as a client (sending e-mail). In this manner, it is possible for each type of connection to enforce an authentication of the other side or at least a certain key length of the symmetric cipher used for encryption. In order to understand how that may be done in accordance with the present invention, it is first helpful to briefly review (E)SMTP, the (Extended) Simple Mail Transfer Protocol.

Mail is transferred using the (Extended) Simple Mail Transfer Protocol. Here, a client connects to a server and issues commands which the server answers with a simple three-digit reply code. This is illustrated, for instance, by the following dialogue:

220 server.sendmail.com ESMTP Sendmail 8.10.0/8.10.0; Tue, 14 Mar. 2000 08:50:48-0800 (PST)
\>\>\> EHLO client.sendmail.com
250-server.sendmail.com Hello client.sendmail.com [10.1.1.2], pleased to meet you
250-STARTTLS
250 HELP
\>\>\> STARTTLS
220 Ready to start TLS
\>\>\> EHLO client.sendmail.com
250-server.sendmail.com Hello client.sendmail.com [10.1.1.2], pleased to meet you
250 HELP
\>\>\> MAIL From:<sender@client.sendmail.com> SIZE=76
250 2.1.0 <sender@client.sendmail.com> . . . Sender ok
\>\>\> RCPT To:<recpient@server.sendmail.com>
250 2.1.5 <recpient@server.sendmail.com> . . . Recipient ok

```
>>> DATA
354 Enter mail, end with "." on a line by itself
>>> .
250 2.0.0 e2EGohX80242 Message accepted for delivery
    recpient@server.sendmail . . . Sent (e2EGohX80242 Mes-
    sage accepted for delivery)
Closing connection to server.sendmail.com.
>>> QUIT
221 server.sendmail.com closing connection
```

The approach underlying the reply codes is very simple: the first digit determines the type of the answer:

2xy ok
    3xy continue
    4xy temporary error
    5xy permanent error

Hence in case of errors, either a 4xy or a 5xy response must be given. This is used by the preferred embodiment to reject connections (either temporarily or permanently).

2. Detailed Operation

The internal handling of both types of connections (incoming and outgoing) is symmetric, so one can concentrate on just one. The following discussion presents the incoming scenario, where sendmail acts as a server to receive e-mail. First the address (IP address or hostname) of the other side (here: client) is looked up in a database. If it is not found, the item TLS_Clt: is looked up in a database to provide a default value. If this is not found either, the connection is accepted. If it is found, the value of the database entry specifies whether the other side must have been authenticated or whether a certain level (also called strength) of encryption is required. This is checked by comparing the values of macros with the requirements. If those requirements are not met, the connection is rejected by giving temporary or permanent error codes for further commands.

a. Internal Operation (Including Use of "Access Map")

For many decisions, sendmail uses a so-called access map, which is a simple database that maps keys (Left Hand Side: LHS) to values (Right Hand Side: RHS).

The basic access map-based internal operation is straightforward:

1. Lookup the client name in the access map. If not found: lookup the client address in the access map. If still not found: lookup a default entry in the access map.
    If nothing found: accept connection.
    If found: continue.
2. Is the entry:
(a) VERIFY:bits: if the client has been authenticated and the key length of the symmetric cipher used for encryption is greater than or equal to bits: accept connection, otherwise fail.
(b) VERIFY: if the client has been authenticated: accept connection, otherwise fail.
(c) ENCR:bits: if the key length of the symmetric cipher used for encryption is greater than or equal to bits: accept connection, otherwise fail.

To fail means here:

If sendmail acts as server: reject further commands with a temporary or permanent error reply code.

If sendmail acts as client: the connection will be aborted (using the SMTP command QUIT) and the message will be either queued (temporary error) or returned to the sender (permanent error).

The decision whether a permanent or temporary error code is used can be made by default when the sendmail.cf file is generated or individually by adding PERM+ or TEMP+, respectively, to the values in the database. Additionally, the required strength of the encryption can in certain situations also be provided by other means, e.g., encryption via a SASL mechanism. SASL (Simple Authentication and Security Layer) is described in RFC2222, on which SMTP AUTH as defined in RFC2554 is based; the disclosure of the foregoing is hereby incorporated by reference. It can provide a certain level of encryption via its security layer.

b. Macro Commands Employed

For STARTTLS, the sendmail binary uses the following macros (commands):

{cert_issuer}: holds the DN of the CA (called the "cert issuer").

{cert_subject}: holds the DN of the CERT (called the "cert subject").

{tls_version}: the TLS/SSL version used for the connection: TLSv1, SSLv3, SSLv2.

{cipher}: the cipher suite used for the connection, such as:
        EDH-DSS-DES-CBC3-SHA
        EDH-RSA-DES-CBC-SHA
        DES-CBC-MD5
        DES-CBC3-SHA
        RC2-CBC-MD5
        RC4-MD5

{cipher_bits}: the key length (in bits) of the symmetric encryption algorithm used for the connection.

{verify}: holds the result of the verification of the presented CERT. Possible values are:

| | |
|---|---|
| OK | verification succeeded |
| NO | no CERT presented |
| FAIL | CERT presented but could not be verified, e.g., CA is missing; or some other error. |
| NONE | STARTTLS has not been performed |
| TEMP | some temporary error occurred |
| PROTOCOL | some internal protocol error occurred |
| SOFTWARE | an error during the TLS handshake occurred |

{server_name}: the name of the server of the current outgoing SMTP connection.

{server_addr}: the address of the server of the current outgoing SMTP connection.

{client_name}: the name of the client of the current incoming SMTP connection.

{client-addr}: the address of the server of the current incoming SMTP connection.

{cert_issuer} and {cert_subject} are both translated into an internal form via a 1—1 mapping called xtextify. In addition to the non-printable ASCII characters, the characters '<', '>', '(', ')', and '+' are translated.

c. Ruleset Description

Rulesets define a simple rewrite engine; in contrast to regular expressions (e.g., ones used in vi, per, and the like), they act on tokens (sequence of characters belonging together) instead of single characters. Each rule consists of an LHS and an RHS: if the pattern on the LHS matches the input it is rewritten according to the RHS. Pattern matching is straightforward, where special symbols are introduced by the dollar sign.

The following two tables explain the metasymbols that can be used in rules.

LHS:
| Metasymbol | matches |
| --- | --- |
| $* | zero or more tokens |
| $+ | one or more tokens |
| $- | one token |
| $@ | empty |
| $X | content of macro X |
| $=C | phrase is member of class C |
| $~C | token is not a member of class C |

RHS:
| Metasymbol | replaced with |
| --- | --- |
| $n | phrase which matched the n th pattern n 2 [1 :: 9] |
| $X | content of macro X |
| $(map key $: def $) | map lookup | d. Source Code (Macro Script) Implementation

The following is representative source code that may be used to generate the sendmail configuration file, "e.g., the rulesets that check whether connections based on certificates and encryptions should be allowed. It is processed by the sendmail m4 macro processor to generate the actual sendmail.cf file.

```
1 Karith arith
2 # possible values for tls_connect in access map
3 C{tls}VERIFY ENCR
4
5 ### LookUpDomain -- search for domain in access database
6 ###
7 ###     Parameters:
8 ###         <$1> -- key (domain name)
9 ###         <$2> -- default (what to return if not found in db)
10 ###        <$3> -- passthru (additional data passed unchanged through)
11 ###        <$4> -- mark (must be <(!|+) single-token>)
12 ###            ! does lookup only with tag
13 ###            + does lookup with and without tag
14
15 SLookUpDomain
16 R<[IPv6 $-]> <$+> <$*> <$*>           $: <[$(dequote $1 $)]> <$2> <$3> <$4>
17 R<$*> <$+> <$*> <$- $->               $: < $(access $5:$1 $: ? $) > <$1> <$2> <$3> <$4 $5>
18 dnl workspace <result-of-lookup|?> <key> <default> <passthru> <mark>
19 ifdef('_FFR_LOOKUPDOTDOMAIN', 'dnl omit first component: lookup .rest
20 R<?> <$+.$+> <$+> <$*> <$- $->        $: < $(access $5:.$2 $: ? $) > <$1.$2> <$3> <$4> <$5 $6>', 'dnl')
21 R<?> <$+> <$+> <$*> <+ $*>            $: < $(access $1 $: ? $) > <$1> <$2> <$3> <+ $4>
22 ifdef('_FFR_LOOKUPDOTDOMAIN', 'dnl omit first component: lookup .rest
23 R<?> <$+.$+> <$+> <$*> <+ $*>         $: < $(access .$2 $: ? $) > <$1.$2> <$3> <$4> <+ $5>', 'dnl')
24 R<?> <[$+.$-]> <$+> <$*> <$*>         $@ $>LookUpDomain <[$1]> <$3> <$4> <$5>
25 R<?> <[$+:$-]> <$+> <$*> <$*>         $: $>LookUpDomain <[$1]> <$3> <$4> <$5>
26 dnl not found, but subdomain: try again
27 R<?> <$+.$+> <$+> <$*> <$*>           $@ $>LookUpDomain <$2> <$3> <$4> <$5>
28 dnl not found, no subdomain: return default
29 R<?> <$+> <$+> <$*> <$*>              $@ <$2> <$3>
30 dnl return result of lookup
31 R<$*> <$+> <$+> <$*> <$*>             $@ <$1> <$4>
32
33 ### LookUpAddress -- search for host address in access database
34 ###
35 ###     Parameters:
36 ###         <$1> -- key (dot quadded host address)
37 ###         <$2> -- default (what to return if not found in db)
38 ###         <$3> -- passthru (additional data passed through)
39 ###         <$4> -- mark (must be <(!|+) single-token>)
40 ###            ! does lookup only with tag
41 ###            + does lookup with and without tag
42
43 SLookUpAddress
44 R<$+> <$+> <$*> <$- $+>               $: < $(access $5:$1 $: ? $) > <$1> <$2> <$3> <$4 $5>
45 R<?> <$+> <$+> <$*> <+ $+>            $: < $(access $1 $: ? $) > <$1> <$2> <$3> <+ $4>
```

-continued

```
46 R<?> <$+:$-> <$+> <$*> <$*>        $: $>LookUpAddress <$1> <$3> <$4> <$5>
47 R<?> <$+.$-> <$+> <$*> <$*>        $@ $>LookUpAddress <$1> <$3> <$4> <$5>
48 R<?> <$+> <$+> <$*> <$*>           $@ <$2> <$3>
49 R<$*> <$+> <$+> <$*> <$*>          $@ <$1> <$4>
50
51 # is connection with client "good" enough? (done in server)
52 # input: ${verify} $| (MAIL|STARTTLS)
53 dnl MAIL: called from check_mail
54 dnl STARTTLS: called from smtp( ) after STARTTLS has been accepted
55 Stls_client
56 ifdef('_ACCESS_TABLE_', 'dnl
57 dnl if MAIL: permanent (STARTTLS has not been offered)
58 dnl if STARTTLS: temporary (offered but maybe failed)
59 R$* $| $*   $: $1 $| $>LookUpDomain <$&{client_name}> <?> < > <!
TLS_CLT_TAG>
60 R$* $| <?>$*$: $1 $| $>LookUpAddress <$&{client_addr}> <?> < > <!
TLS_CLT_TAG>
61 dnl do a default lookup: just TLS_CLT_TAG
62 R$* $| <?>$*$: $1 $| <$(access TLS_CLT_TAG: $: ? $)>
63 R$*                $@ $>"tls_connection" $1', 'dnl
64 R$* $| $*          $@ $>"tls_connection" $1')
65
66 # is connection with server "good" enough? (done in client)
67 dnl i.e. has the server been authenticated and is encryption active?
68 dnl called from deliver( ) after STARTTLS command
69 # input: ${verify}
70 Stls_server
71 ifdef('_ACCESS_TABLE_', 'dnl
72 R$*                $: $1 $| $>LookUpDomain <$&{server_name}> <?> < > <!
TLS_Srv>
73 R$* $| <?>$*$: $1 $| $>LookUpAddress <$&{server_addr}> <?> < > <!
TLS_Srv>
74 dnl do a default lookup: just TLS_Srv
75 R$* $| <?>$* $: $1 $| <$(access TLS_Srv: $: ? $)>
76 R$*                $@ $>"tls_connection" $1', 'dnl
77 R$*                $@ $>"tls_connection" $1')
78
79 Stls_connection
80 ifdef('_ACCESS_TABLE_', 'dnl
81 dnl common ruleset for tls_{client|server}
82 dnl input: $&{verify} $| < ResultOfLookup> [< >]
83 dnl remove optional < >
84 R$* $| <$*>$*                      $: $1 $| <$2>
85 dnl permanent or temporary error?
86 R$* $| <PERM + $={tls} $*>         $: $1 $| <503:5.7.0> <$2 $3>
87 R$* $| <TEMP + $={tls} $*>         $: $1 $| <403:4.7.0> <$2 $3>
88 dnl default case depends on TLS_PERM_ERR
89 R$* $| <$={tls} $*>                $: $1 $| <ifdef('TLS_PERM_ERR',
'503:5.7.0', '403:4.7.0')> <$2 $3>
90 dnl deal with TLS handshake failures: abort
91 RSOFTWARE $| <$-:$+> $* $#error $@ $2 $: $1 " TLS handshake failed."
92 dnl no <reply:dns> i.e. not requirements in the access map
93 dnl use default error
94 RSOFTWARE $| $*     $#error $@ ifdef('TLS_PERM_ERR', '5.7.0',
'4.7.0') $: "ifdef ('TLS_PERM_ERR', '503', '403') TLS handshake failed."
95 R$* $| <$*> <VERIFY>               $: <$2> <VERIFY> $1
96 R$* $| <$*> <$={tls}:$->$*         $: <$2> <$3:$4> $1
97 dnl some other value in access map: accept
98 dnl this also allows to override the default case (if used)
99 R$ $| $*                           $@ OK
100 # authentication required: give appropriate error
101 # other side did authenticate (via STARTTLS)
102 dnl workspace: <SMTP:ESC> <{VERIFY,ENCR} [:BITS]> ${verify}
103 dnl only verification required and it succeeded
104 R<$*><VERIFY> OK                   $@ OK
105 dnl verification required + some level of encryption
106 R<$*><VERIFY:$-> OK                $: <$1> <REQ:$2>
107 dnl just some level of encryption required
108 R<$*><ENCR:$-> $*                  $: <$1> <REQ:$2>
109 dnl verification required but ${verify} is not set
110 R<$-:$+><VERIFY $*>                $#error $@ $2 $: $1 " authentication
required"
111 R<$-:$+><VERIFY $*> FAIL $#error $@ $2 $: $1 " authentication failed"
112 R<$-:$+><VERIFY $*>NO       $#error $@ $2 $: $1 " not
authenticated"
113 R<$-:$+><VERIFY $*> NONE $#error $@ $2 $: $1 " other side does not
support STARTTLS"
114 dnl some other value for ${verify}
```

-continued

```
    115 R<$-:$+><VERIFY $*> $+        $#error $@ $2 $: $1 " authentication
failure " $4
    116 dnl some level of encryption required: get the maximum level
    117 R<$*><REQ:$->                 $: <$1> <REQ:$2> $>max $&{cipher_bits}
: $&{auth_ssf}
    118 dnl compare required bits with actual bits
    119 R<$*><REQ:$-> $-              $: <$1> <$2:$3> $(arith 1 $@ $3 $@ $2 $)
    120 R<$-:$+><$-:$-> TRUE          $#error $@ $2 $: $1 " encryption too
weak " $4 " less than " $3
    121
    122 Smax
    123 dnl compute the max of two values separated by :
    124 R:                            $: 0
    125 R:$-                          $: $1
    126 R$-:                          $: $1
    127 R$-:$-                        $: $(arith 1 $@ $1 $@ $2 $) : $1 : $2
    128 RTRUE:$-:$-                   $: $2
    129 R$-:$-:$-                     $: $2',
    130 'dnl use default error
    131 dnl deal with TLS handshake failures: abort
    132 RSOFTWARE   $#error $@ ifdef('TLS_PERM_ERR', '5.7.0', '4.7.0') $:
"ifdef('TLS_PERM_ERR', '503', '403') TLS handshake." ')
```

(Line numbers have been added to clarify the following description.)

As illustrated by the above source code and also shown in accompanying FIGS. 4A–I, the system's authentication methodology for supporting remote connections to/from a Message Transfer Agent is as follows. At line 1, the method defines a map called "arith" to perform arithmetic operations. At line 3, the method next defines a class {tls} which contains VERIFY and ENCR as elements. At line 15, the method defines a ruleset called "LookUpDomain" which has four parameters all of which are included in angle brackets:

1: key (domain name, i.e., a name like host.example.com)
2: default (what to return if not found in access map)
3: passthru (additional data passed unchanged through)
4: mark tag
   where mark is: ! does lookup only with tag
   or: + does lookup with and without tag If the key is of the form [IPv6 . . . ] then the method removes "IPv6" and transforms the value into a token usable by sendmail (using a "dequote" map which removes quotes from strings). This is illustrated by line 16. (IPv6 or IPng is a new version of the Internet Protocol (IP), that is, "Internet Protocol next generation.") At line 17, the method looks up the key in the access map with a leading tag as given in the fourth argument. If the key is not found in the map, the first element of the new workspace will be <?>.

The rules for lines 19 to 29 are applied only if none of their preceding rules result in a match (a successful lookup in the access map). At line 20, if the sendmail (m4) macro_FFR_LOOKUPDOTDOMAIN is defined, then the method omits the first component of the key and looks up ".rest" with a leading tag as given in the last argument. At line 21, if the mark is '+', then the method looks up just the key (without the tag). At line 23, if the m4 macro_FFR_LOOKUPDOTDOMAIN is defined and the mark is '+', then the method omits the first component of the key and looks up ".rest". At line 24, if the key is of the form [1.2.3.4] (i.e., an IPv4 address), then the method omits the last component (the least significant part) and recursively call "LookUpDomain" again. At line 25, if the key is of the form [1:2:3:4:6:7:8] (i.e., an IPv6 address), then the method omits the last component (the least significant part) and recursively calls "LookUpDomain" again. At line 27, if the key is of the form "first.rest", then the method omits the first component (the least significant part) and recursively calls "LookUpDomain" again.

Line 29 represents that nothing has been found and the key consists only of a single component. In this case, the method stops the lookup and returns <default> <passthru>. Line 31 represents that something has been found. In that case, the method returns the result (RHS) of the lookup and the passthru value.

A ruleset called "LookUpAddress" is defined at line 43. It has four parameters, all of which are included in angle brackets:

1: key (dot quadded host address)
2: default (what to return if not found in access map)
3: passthru (additional data passed unchanged through)
4: mark tag
   where mark is: ! does lookup only with tag
   or: + does lookup with and without tag At line 44, the method looks up the key in the access map with a leading tag as given in the fourth argument. If the key is not found in the map, the first element of the new workspace will be <?>.

The rules in lines 45 to 48 only apply if none of their preceeding rules result in a match (a successful lookup in the access map). At line 45, if the mark is '+', then the method looks up just the key (without the tag). At line 46, if the key is of the form 1:2:3:4:6:7:8 (i.e., an IPv6 address), then the method omits the last component (the least significant part) and recursively calls "LookUpAddress" again. At line 47, if the key is of the form 1.2.3.4 (i.e., an IPv4 address), then the method omits the last component (the least significant part) and recursively calls "LookUpAddress" again.

Line 48 represents that nothing has been found and the key consists only of a single component. In such a case, the method stops lookup and returns <default> <passthru>. Line 49 represents that something has been found. In that case, the method returns the RHS of the lookup and the passthru value.

A ruleset called "tls_client" is defined at line 55. It is called whenever sendmail connects to a client to send an e-mail. This ruleset receives as input the value of the macro {verify} and either MAIL or STARTTLS as second argument. At line 56, the rules in lines 59 to 63 are active if the access map is selected (m4 macro_ACCESS_TABLE_), otherwise, the rule in line 64 is active. At line 59, the method looks up the name of the client using the "LookUpDomain" ruleset with "TLS_Clt" as a required tag. At line 60, if the previous lookup did not succeed, the method looks up the IP address of the client using the "LookUpAddress" ruleset with "TLS_Clt" as a required tag. At line 62, if the previous lookups did not succeed, the method looks up "TLS_Clt" in the access map. At lines 63/64, the method calls the ruleset "tls_connection". A ruleset called "tls_server" is defined at line 70. It is called whenever sendmail sends e-mail to a server. This ruleset receives as input the value of the macro {verify}. Line 71 represents that the rules in line 72 to 76 are active if the access map is selected (m4 macro_ACCESS_TABLE_), otherwise the rule in line 77 is active.

At line 59, the method looks up the name of the server using the "LookUpDomain" ruleset with "TLS_Srv" as a required tag. At line 60, if the previous lookup did not succeed, the method looks up the IP address of the server using the "LookUpAddress" with "TLS_Srv" as a required tag. At line 62, if the previous lookups did not succeed, the method looks up "TLS_Srv" in the access map.

At lines 76/77, the method calls the ruleset tls_connection. As line 79, the method defines a ruleset, "tls_connection", which receives as input the value of the macro {verify} and the result of the lookup in the access map and an optional < >. Line 80 represents that the rules in line 84 to 129 are active if the access map is selected (m4 macro ACCESS_TABLE_), otherwise the rule in line 132 is active. At line 84, the method removes optional < >. At line 86, if the result of the lookup starts with PERM+, the method adds <503:5.7.0> to the workspace. At line 87, if the result of the lookup starts with TEMP+, the method adds <403:4.7.0> to the workspace. At line 89, depending on the m4 macro TLS_PERM_ERR, the method adds either <403:4.7.0> or <503:5.7.0> to the workspace.

At line 91, if the value of the macro {verify} is SOFTWARE, the method returns an error, because the TLS handshake failed (required by the protocol) using the error code selected before. At line 94, if the value of the macro {verify} is SOFTWARE but no error code has been selected before, the method returns an error, because the TLS handshake failed (required by the protocol). The error depends on the m4 macro TLS_PERM_ERR, as explained before (line 89). At line 95, if the result of the access map lookup is VERIFY, use this for further tests. If, on the other hand, the result of the access map lookup is VERIFY:bits or ENCR:bits, the method uses this for further tests.

At line 99, if neither of the previous two tests succeeds (something else has been returned by the lookup) the method stops now, returning "OK". At line 104, if the result of the lookup is VERIFY and value of the macro {verify} is OK, then the method stops and returns "OK". At line 106, if the result of the lookup is VERIFY:bits and the value of the macro {verify} is OK, then the method translates this into REQ:bits. At line 108, if the result of the lookup is ENCR:bits, then the method translates this into REQ:bits. At lines 110 to 115, if the result of the lookup is VERIFY (with optional:bits), then the method returns an appropriate error code because the value of the macro {verify} is not OK (see line 104 and 106).

At line 117, the method calls the ruleset "max" to compute the maximum of {cipher_its} and {auth_ssf}. At line 119, if the required key length (:bits) is greater than the used key length, the method transforms the workspace to TRUE. At line 120, if the workspace contains TRUE (from the previous rule), the provided encryption is too weak, whereupon the method returns an error. At line 122, the "max" ruleset is actually defined, which gets two arguments separated by a colon. At line 124, if both arguments are empty, the method returns 0. At line 125, if the first argument is empty, the method returns the second. If the second argument is empty, however, the method returns the first. At line 127, the method compares the first and the second argument: if the first is less than the second, the method puts TRUE in front of the workspace. At line 128, if the first argument is less than the second, the method returns the second. Otherwise, at line 129, the method returns the first argument. At line 132, if the access map is not used and the value of the macro {verify} is SOFTWARE, the method returns an error, because the TLS handshake failed (required by the protocol). The error depends on the m4 macro TLS_PERM_ERR as explained before (line 89).

e. Interaction of sendmail with the Rulesets (1) sendmail as Server sendmail calls the ruleset tls_client after the STARTTLS command has been accepted. If the ruleset resolves to $#error, then subsequent SMTP commands (except RSET, EHLO, HELO, NOOP, and QUIT) will be rejected with an error. The ruleset tls_client is also used by the ruleset check_mail which is called from sendmail after the MAIL command has been given by the client. This is required to avoid problems if a client does not issue a STARTTLS command at all.

(2) sendmail as Client sendmail calls the ruleset tls_server after the STARTTLS command has been tried. It will also call the ruleset if the server does not support STARTTLS. If the ruleset resolves to $#error, then the SMTP connection will be aborted by giving a QUIT command.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In an electronic mail (e-mail) system, a method for sending an e-mail message using a secured connection that employs encryption, the method comprising:

receiving at a message transfer agent (MTA) a request from a client for establishing a secured connection with the MTA for sending an e-mail message;

attempting to authenticate the client, through use of a certificate, in order to identify the client as approved for establishing a secured connection with the MTA;

if the client cannot be authenticated, terminating the method without establishing the secured connection and without sending the e-mail message;

if the client can be authenticated, establishing the secured connection between the client and the MTA;

determining whether the encryption employed for the secured connection meets a predefined minimum encryption strength;

if the encryption employed does not meet the predefined minimum encryption strength, terminating the secured connection without sending the e-mail message, whereupon the method terminates; and if the encryption employed does meet the predefined minimum encryption strength sending the e-mail message.

2. The method of claim 1, wherein said minimum encryption strength comprises a particular key length of a symmetric cipher used for encryption.

3. The method of claim 1, wherein said step of terminating the method without establishing the secured connection includes:
   returning a temporary error reply code.

4. The method of claim 1, wherein said step of terminating the method without establishing the secured connection includes:
   returning a permanent error reply code.

5. The method of claim 1, wherein the e-mail message is returned to an original sender for the message if the client cannot be authenticated.

6. The method of claim 1, wherein the e-mail message is queued for future sending if the client cannot be authenticated.

7. The method of claim 1, wherein said step of determining whether the encryption employed for the secured connection meets a predefined minimum encryption strength employs SASL (Simple Authentication and Security Layer) protocol.

8. The method of claim 1, wherein said client is remote from said e-mail system.

9. The method of claim 1, wherein said client includes a Mail User Agent.

10. The method of claim 9, wherein the Mail User Agent communicates with the e-mail system via SMTP (Simple Mail Transport Protocol).

11. The method of claim 1, wherein said MTA comprises a Sendmail-compatible Message Transfer Agent (MTA) and wherein said method is controlled, at least in part, by a configuration file for the Sendmail-compatible MTA.

12. The method of claim 1, wherein said certificate comprises a signed public key.

13. The method of claim 1, wherein said certificate comprises an X.509 certificate.

14. The method of claim 1, wherein said step of terminating the method without establishing the secured connection includes:
   rejecting at least some subsequent SMTP commands received from the client.

15. The method of claim 14, wherein the rejected SMTP commands are rejected with an error.

16. In an electronic mail (e-mail) system, a method for sending an e-mail message using a secured connection that employs encryption, the method comprising:
   attempting at a first message transfer agent (MTA) to establish a secured connection with a second MTA for sending an e-mail message;
   attempting to authenticate the second MTA, through use of a certificate, in order to identify the second MTA as approved for establishing a secured connection with the first MTA;
   if the second MTA cannot be authenticated, terminating the method without establishing the secured connection and without sending the e-mail message;
   if the second MTA can be authenticated, establishing the secured connection between the first MTA and the second MTA;
   determining whether the encryption employed for the secured connection meets a predefined minimum encryption strength;
   if the encryption employed does not meet the predefined minimum encryption strength, terminating the secured connection without sending the e-mail message, whereupon the method terminates; and
   if the encryption employed does meet the predefined minimum encryption strength, sending the e-mail message.

17. The method of claim 16, wherein said minimum encryption strength comprises a particular key length of a symmetric cipher used for encryption.

18. The method of claim 16, wherein said step of terminating the method without establishing the secured connection includes:
   returning a temporary error reply code.

19. The method of claim 16, wherein said step of terminating the method without establishing the secured connection includes:
   returning a permanent error reply code.

20. The method of claim 16, wherein the e-mail message is returned to an original sender for the message if the second MTA cannot be authenticated.

21. The method of claim 16, wherein the e-mail message is queued for future sending if the second MTA cannot be authenticated.

22. The method of claim 16, wherein said step of determining whether the encryption employed for the secured connection meets a predefined minimum encryption strength employs SASL (Simple Authentication and Security Layer) protocol.

23. The method of claim 16, wherein said second MTA is remote from said e-mail system.

24. The method of claim 16, wherein said first MTA originally received the e-mail message from a client that connects to the e-mail system using a Mail User Agent.

25. The method of claim 24, wherein the Mail User Agent communicates with the e-mail system via SMTP (Simple Mail Transport Protocol).

26. The method of claim 16, wherein said first MTA comprises a Sendmail-compatible Message Transfer Agent (MTA) and wherein said method is controlled, at least in part, by a configuration file for the Sendmail-compatible MTA.

27. The method of claim 16, wherein said certificate comprises a signed public key.

28. The method of claim 16, wherein said certificate comprises an X.509 certificate.

29. The method of claim 16, wherein the first MTA communicates with the second MTA using SMTP (Simple Mail Transport Protocol).

30. The method of claim 29, wherein said step of terminating the method without establishing the secured connection includes:
   issuing an SMTP QUIT command.

31. An electronic mail (e-mail) system comprising:
   a message transfer agent (MTA) available for a client to connect to;
   program logic for authenticating the client, through use of a certificate, in order to identify the client as approved for establishing a secured connection with the MTA;
   program logic for establishing a secured connection between the client and the MTA in instances where the client can be authenticated;
   program logic for testing encryption strength of the secured connection; and
   program logic for terminating the secured connection in instances where the secured connection has inadequate encryption strength.

32. The system of claim 31, wherein the client includes Mail User Agent (MUA) software.

33. The system of claim 31, wherein the e-mail message is communicated to the MTA via SMTP (Simple Mail Transport Protocol).

34. The system of claim 31, wherein said certificate comprises a signed public key.

35. The system of claim 31, wherein said certificate comprises an X.509 certificate.

* * * * *